(12) United States Patent
Benevelli et al.

(10) Patent No.: US 10,194,594 B2
(45) Date of Patent: Feb. 5, 2019

(54) AUXILIARY POWER SYSTEM FOR AN AGRICULTURAL BALER WITH MECHANICAL FLYWHEEL BRAKING

(71) Applicant: CNH Industrial America LLC, New Holland, PA (US)

(72) Inventors: Alessandro Benevelli, Albinea (IT); Jonathan De Fraine, Brakel (BE)

(73) Assignee: CNH Industrial America LLC, New Holland, PA (US)

(*) Notice: Subject to any disclaimer, the term of this patent is extended or adjusted under 35 U.S.C. 154(b) by 205 days.

(21) Appl. No.: 15/324,375

(22) PCT Filed: Jul. 6, 2015

(86) PCT No.: PCT/EP2015/065380
§ 371 (c)(1),
(2) Date: Jan. 6, 2017

(87) PCT Pub. No.: WO2016/005334
PCT Pub. Date: Jan. 14, 2016

(65) Prior Publication Data
US 2018/0177134 A1  Jun. 28, 2018

(30) Foreign Application Priority Data
Jul. 9, 2014  (BE) .................................. 2014/0532

(51) Int. Cl.
*A01F 15/04* (2006.01)
*A01F 15/08* (2006.01)
(Continued)

(52) U.S. Cl.
CPC .......... *A01F 15/0841* (2013.01); *A01D 69/02* (2013.01); *A01F 15/042* (2013.01);
(Continued)

(58) Field of Classification Search
CPC .... A01F 15/04; A01F 15/042; A01F 15/0841; A01F 15/0875; A01F 15/08; A01F 21/00;
(Continued)

(56) References Cited

U.S. PATENT DOCUMENTS 3,139,969 A * 7/1964 Sullivan ............... A01D 87/125
100/188 BT
6,105,353 A  8/2000 Mohr et al.
(Continued)

FOREIGN PATENT DOCUMENTS

WO  20130135794 A1  9/2013

*Primary Examiner* — Jimmy T Nguyen
(74) *Attorney, Agent, or Firm* — Peter K. Zacharias; Patrick M. Sheldrake

(57) ABSTRACT

An agricultural baler includes a plunger reciprocally movable within a main bale chamber during a compression stroke and a return stroke, a flywheel associated with the plunger, and a driveline associated with the flywheel and couplable with a power take-off (PTO) of a traction unit. The baler further includes an APS coupled with the driveline and configured for receiving power from the driveline and storing the power. A PTO indicator provides an output signal indicative of an engagement of the PTO. An electrical processing circuit is coupled with the APS and the PTO indicator, and controls operation of the APS, dependent on the output signal from the PTO indicator.

14 Claims, 5 Drawing Sheets

(51) Int. Cl.
*B30B 9/30* (2006.01)
*A01D 69/02* (2006.01)
*A01F 21/00* (2006.01)

(52) U.S. Cl.
CPC .......... *A01F 15/0875* (2013.01); *A01F 21/00* (2013.01); *B30B 9/305* (2013.01); *B30B 9/3007* (2013.01)

(58) Field of Classification Search
CPC ........ A01D 69/02; B30B 9/30; B30B 9/3007; B30B 9/305; B60K 17/28
USPC ............................................ 100/179; 700/50
See application file for complete search history.

(56) References Cited

U.S. PATENT DOCUMENTS

| | | | |
|---|---|---|---|
| 2003/0159421 A1* | 8/2003 | Trelstad | A01F 15/0841 56/341 |
| 2003/0167939 A1 | 9/2003 | Roth | |
| 2008/0127839 A1* | 6/2008 | Fahrenbach | B30B 1/14 100/214 |
| 2010/0108413 A1* | 5/2010 | Lang | A01F 15/0841 180/53.1 |
| 2013/0152805 A1* | 6/2013 | Roth | A01F 15/0841 100/35 |
| 2014/0137757 A1 | 5/2014 | Nelson et al. | |
| 2017/0244300 A1* | 8/2017 | Ben David | H02K 7/025 |

\* cited by examiner

# AUXILIARY POWER SYSTEM FOR AN AGRICULTURAL BALER WITH MECHANICAL FLYWHEEL BRAKING

CROSS REFERENCE TO RELATED APPLICATION

This application is the National Stage of International Application No. PCT/EP2015/065380 filed Jul. 6, 2015, which claims priority to Belgium Patent Application No. 2014/0532 filed Jul. 9, 2014, the contents of which are incorporated herein by reference.

FIELD OF THE INVENTION

The present invention relates to agricultural balers, and, more particularly, to systems for powering such balers.

DESCRIPTION OF THE RELATED ART

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers which extend laterally outward from the sides of the plunger. The rollers on each side of the plunger are received within a respective plunger slot formed in the side walls of the bale chamber, with the plunger slots guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

During a compression cycle of the plunger as described above, the plunger moves through a compression stroke as it advances into the main bale chamber, with the highest load on the plunger occurring at the end of each compression stroke. As balers become increasingly larger, the peak loads on the plunger during compression strokes likewise become increasingly larger. One way to compensate for these higher peak loads is to use a larger flywheel coupled with a gearbox which drives the plunger. As the plunger reaches the end of the compression stroke, the momentum of the heavier flywheel helps carry the plunger through the peak load at the end of the compression stroke. If the flywheel is not heavy enough then high loads are transferred back through the driveline to the base unit, which can result in lugging down of the engine onboard the base unit. However, a flywheel which is too large is also undesirable since it typically requires a base unit with a larger horsepower (HP) rating to start and drive the flywheel forming part of the driveline of the baler.

According to regulations in some geographic areas, an operator should only be able to open the hood of the large square baler when the flywheel has come to a complete standstill. On production machines today this may be accomplished with a manually operated and mechanically actuated brake which is coupled with the latch on the hood. However, this type of brake requires a lot of effort on the part of the operator. With a larger flywheel as described above, this type of manually actuated brake may also be somewhat ineffective at braking the rotation of the flywheel.

What is needed in the art is an agricultural baler which effectively brakes the rotation of the flywheel.

SUMMARY OF THE INVENTION

The present invention provides an agricultural baler with an auxiliary power system (APS) which functions to brake the rotation of the flywheel and use the energy recovered during the braking operation to charge the APS.

The invention in one form is directed to an agricultural baler including a plunger reciprocally movable within a main bale chamber during a compression stroke and a return stroke, a flywheel associated with the plunger, and a driveline associated with the flywheel and couplable with a power take-off (PTO) of a traction unit. The baler is characterized by an APS coupled with the driveline and configured for receiving power from the driveline and storing the power. A PTO indicator provides an output signal indicative of an engagement of the PTO. An electrical processing circuit is coupled with the APS and the PTO indicator, and controls operation of the APS, dependent on the output signal from the PTO indicator.

An advantage of the present invention is that the APS can be used to brake the rotation of the flywheel, rather than requiring manual braking by an operator.

Another advantage is that power is stored in the APS upon shutdown of the baler, and can be subsequently used for various purposes.

Yet another advantage is that the flywheel is stopped by the APS prior to an operator descending from an operator cab and accessing the flywheel under the hood for service, etc.

A further advantage is that fuel consumption is reduced.

Another advantage is that the APS results in greater comfort for the operator, since peak impulse loads are not transferred back through the driveline to the traction unit.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
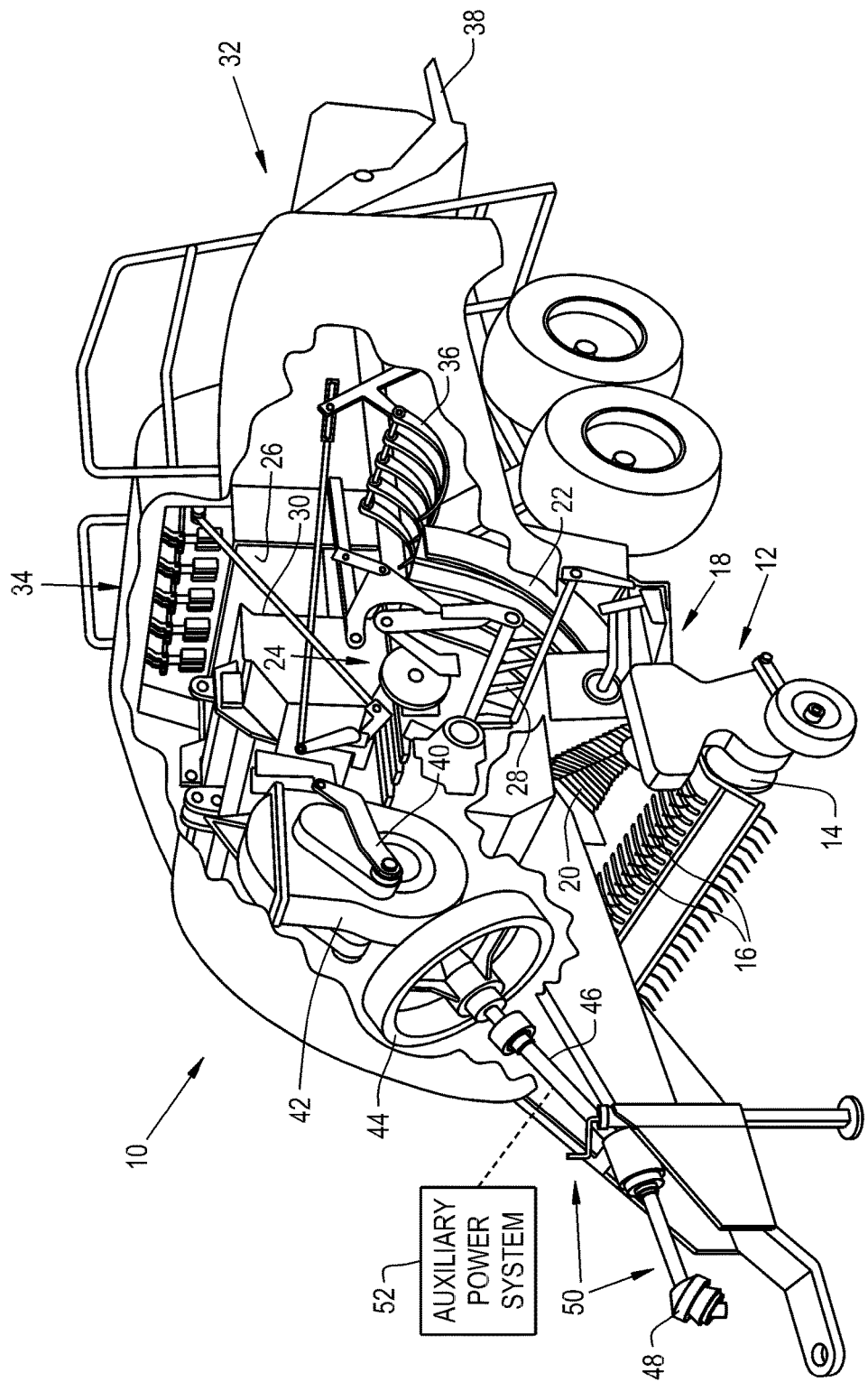
FIG. 1 is a perspective cutaway view showing the internal workings of a large square baler, which may include an APS of the present invention.

Referring now to the drawings, and more particularly to FIG. 1, there is shown a perspective cutaway view showing the internal workings of a large square baler 10. Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. Pre-compression chamber 22 and packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Plunger 30 is connected via a crank arm 40 with a gear box 42. Gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). PTO coupler 48, drive shaft 46 and flywheel 44 together define a portion of a driveline 50 which provides rotative power to gearbox 42. Flywheel 44 has a sufficient mass to carry plunger 30 through a compression stroke as power is applied to drive shaft 46 by the traction unit. Without the flywheel, a large mechanical load (impulse) is placed on the traction unit as peak power is required by the baler during operation, such as at the end of a compression stroke and/or during a stuffer unit stroke. Generally speaking, as balers become increasingly larger the size of the flywheel also becomes increasingly larger. A larger flywheel also in turn typically requires the use of a traction unit with a higher horsepower rating, to maintain input power to the drive shaft 46 during operation, and since higher power is required to start rotation of the flywheel from an at-rest position.

Figure 2:
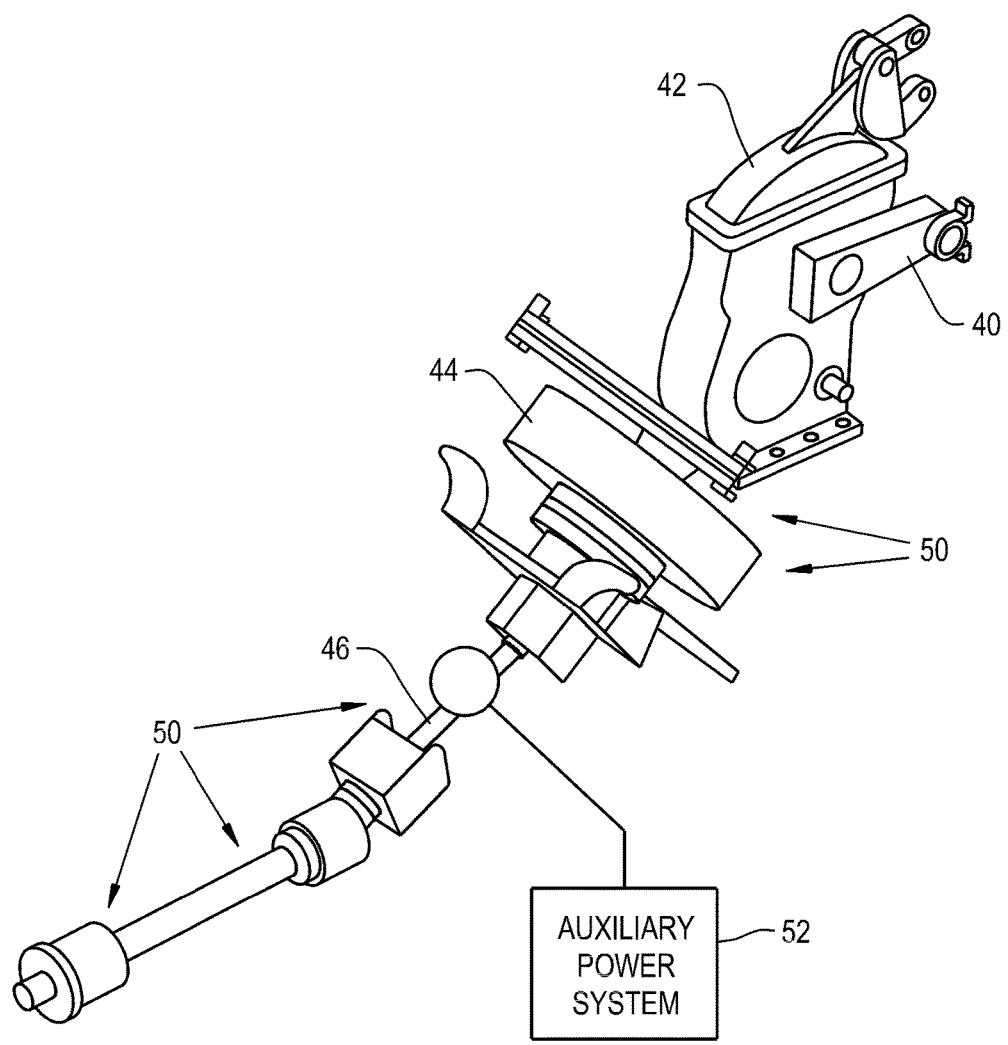
FIG. 2 is a perspective view of the driveline, gearbox and APS shown in FIG. 1.
Figure 3:
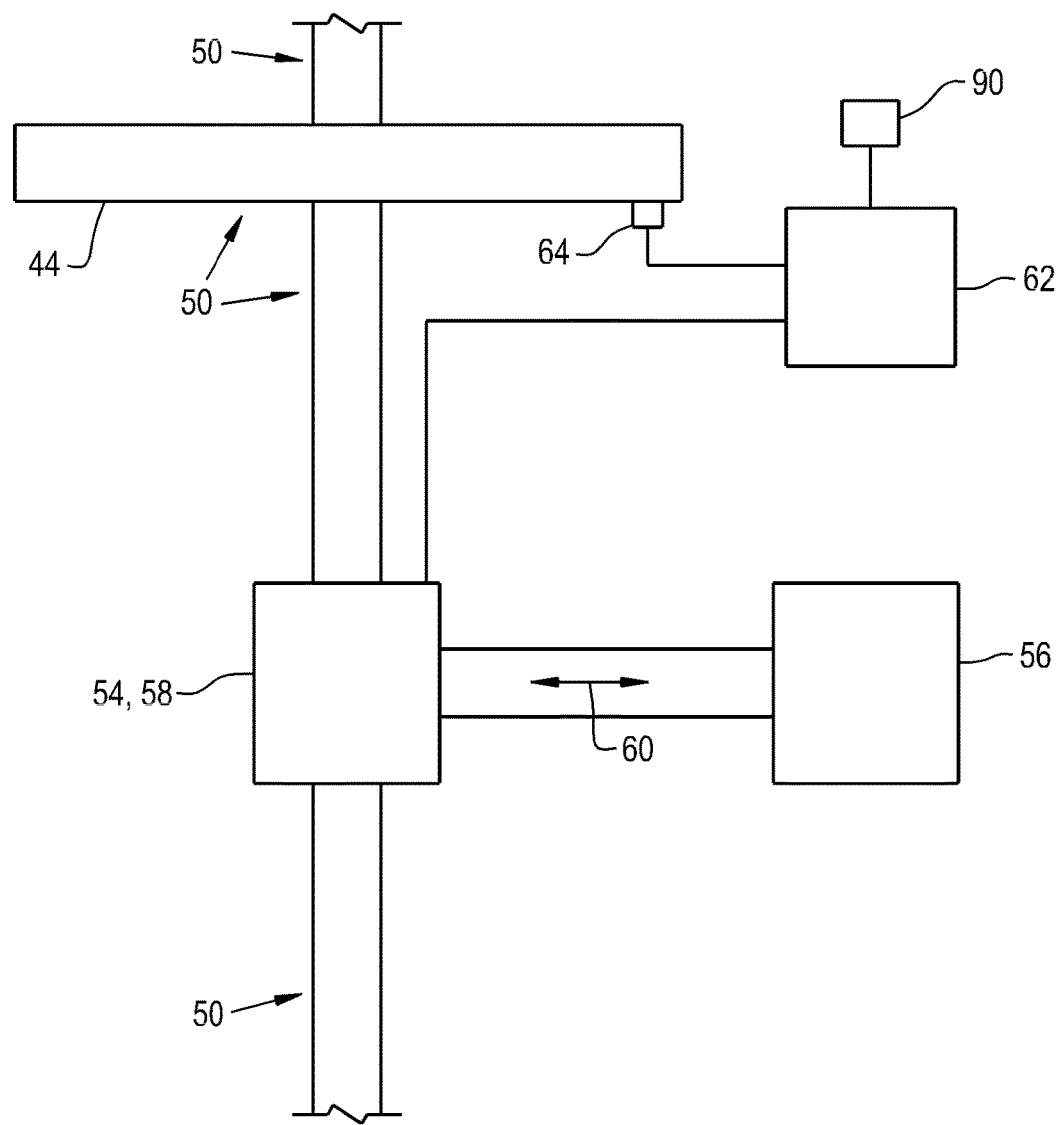
FIG. 3 is a block diagram showing a simplified embodiment of the APS of the present invention.

According to an aspect of the present invention, and referring now to FIGS. 1-3, conjunctively, baler 10 also includes an auxiliary power system (APS) 52 which is coupled with the driveline 50 in parallel with the flywheel 44, and generally functions to receive power from the driveline 50 and store the power. The APS 52 can also optionally transmit the stored power back to the driveline 50.

APS 52 generally includes a power generation device 54 for receiving power from the driveline 50 and generating power, a power storage device 56 coupled with and storing power from the power generation device 54, and an optional power feedback device 58 for transmitting the stored power back to the driveline. In the block diagram shown in FIG. 3, the power generation device 54 and the power feedback device 58 are configured as the same unit which can operate with different functionality, such as a hydraulic pump/motor or an electric motor/generator. When configured as a hydraulic pump/motor, the power storage device 56 can be in the form of one or more hydraulic accumulators. Alternatively, when configured as an electric motor/generator, the power storage device 56 can be in the form of one or more ultracapacitors and/or batteries. With this type of dual functionality, the power storage device 56 is connected with the power generation device 54/power feedback device 58 in a bidirectional manner allowing 2-way flow of power, as indicated by double headed arrow 60.

Alternatively, the power generation device 54 and the power feedback device 58 can be separate and discrete units which are each coupled with the driveline 50 and power storage device 56. For example, the power generation device 54 can be in the form of a hydraulic pump, and the power feedback device 58 can be in the form of a separate hydraulic motor, each of which are mechanically coupled with the driveline 50 and hydraulically coupled with a power storage device in the form of an accumulator (not specifically shown). Moreover, the power generation device 54 can be in the form of an electric motor, and the power feedback device 58 can be in the form of a separate electric generator, each of which are mechanically coupled with the driveline 50 and electrically coupled with a power storage device 56 in the form of an ultracapacitor and/or battery (not specifically shown).

The power storage device 56 shown in FIG. 3 can also be configured differently than one or more hydraulic accumulators, ultracapacitors and/or batteries. For example, the power storage device 56 can be configured as an additional mechanical flywheel which receives/transmits power from/to the driveline 50. The power storage device 56 must somehow be capable of receiving and storing power during off-peak load periods. The power generation device 54 and the power feedback device 58 can be configured as a continuously variable transmission (CVT), and the additional flywheel would somehow be capable of receiving and storing power during off-peak load periods and transferring the power back to the driveline 50 for use during peak load periods.

For purposes of discussion hereinafter, it will be assumed that the power generation device 54 and the power feedback device 58 are in the form of a singular unit configured as a hydraulic pump/motor. Pump/motor 54, 58 is coupled with and under the control of an electrical processing circuit 62, which can be in the form of an electronic control unit (ECU) or an analog processor. Electrical processing circuit 62 can be a dedicated ECU onboard the baler 10, or can also be part of an ECU used for other purposes onboard the baler 10. Alternatively, electrical processing circuit 62 can also be an ECU onboard the traction unit which tows the baler 10, and can be coupled with the pump/motor 54, 58 and other components onboard baler 10 in a wired or wireless manner.

Electrical processing circuit 62 controls operation of pump/motor 54, 58 in a manner such that power is transmitted to the driveline 50 prior to and during peak load periods on the baler 10, and power is received from the driveline 50 during off-peak load periods on the baler 10. More specifically, power is transmitted to/from the driveline 50 dependent upon a position of the plunger 30 within the main bale chamber 26, and/or a variable associated with the formation of a slice of crop material within the bale chamber 26. To this end, the electrical processing circuit 62 is connected with one or more sensors 64 which provide output signals indicative of the position of the plunger 30 and/or a crop slice variable. In the embodiment shown in FIG. 3, the sensor 64 is positioned adjacent to flywheel 44 to determine the rotational position of the flywheel 44, such as by using a proximity sensor, optical sensor, etc. The position of the flywheel 44 can in turn be used to establish the position of the plunger 30 within the main bale chamber 26. Alternatively, the sensor 64 can be configured to sense a variable associated with crop slice formation within the main bale chamber 26. Examples of crop slice formation variables may include a moisture content of the crop material, a thickness of a given slice of crop material and/or a positional change of the plunger at maximum compression for each slice of the crop material. Alternatively, the variable associated with the crop slice formation can even be input by a user, such as a particular type of crop material being harvested. Other input variables may also be used for controlling operation of APS 52.

Figure 4:
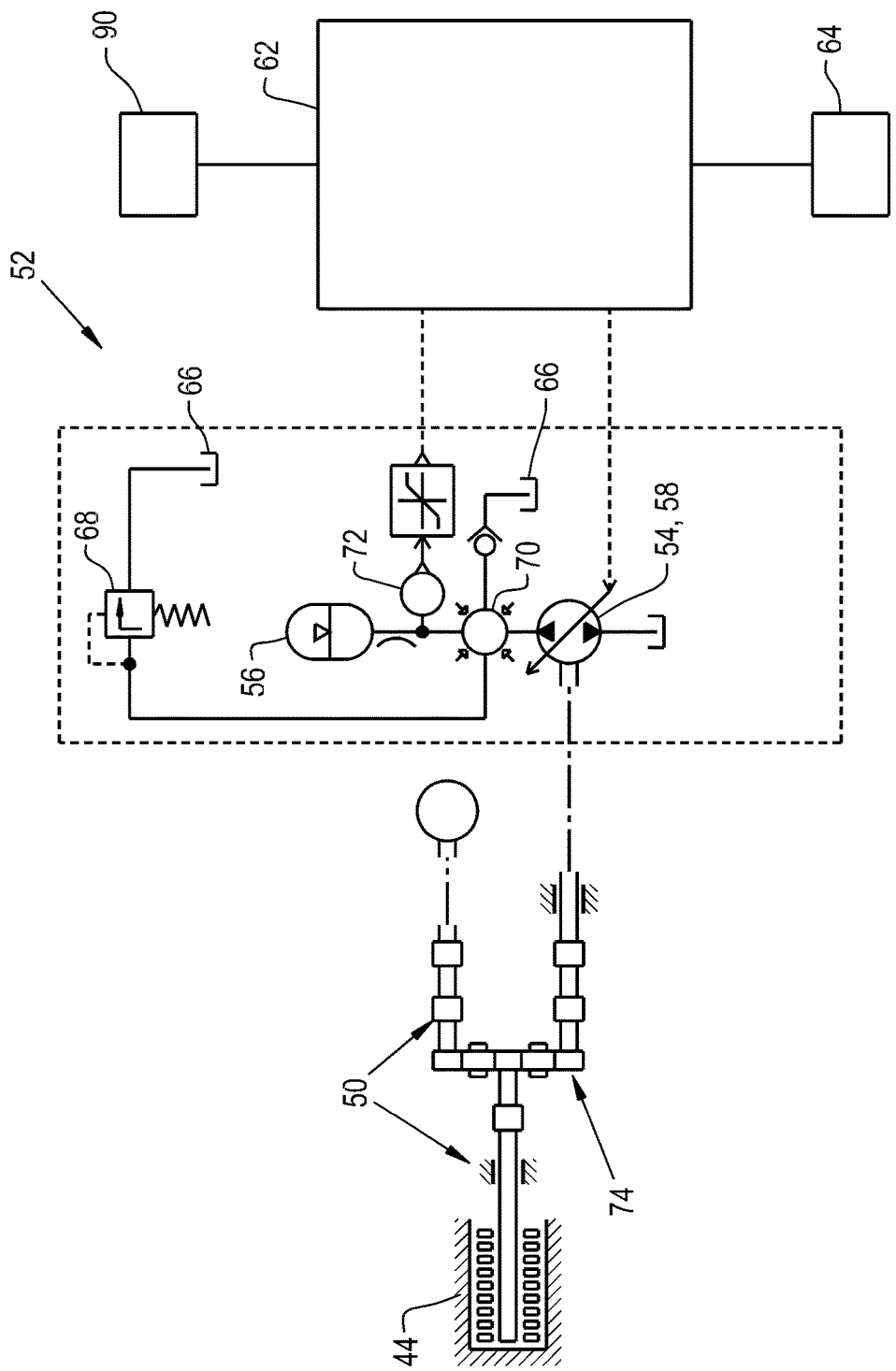
FIG. 4 is a control schematic of an embodiment of the APS of the present invention.
Figure 5:
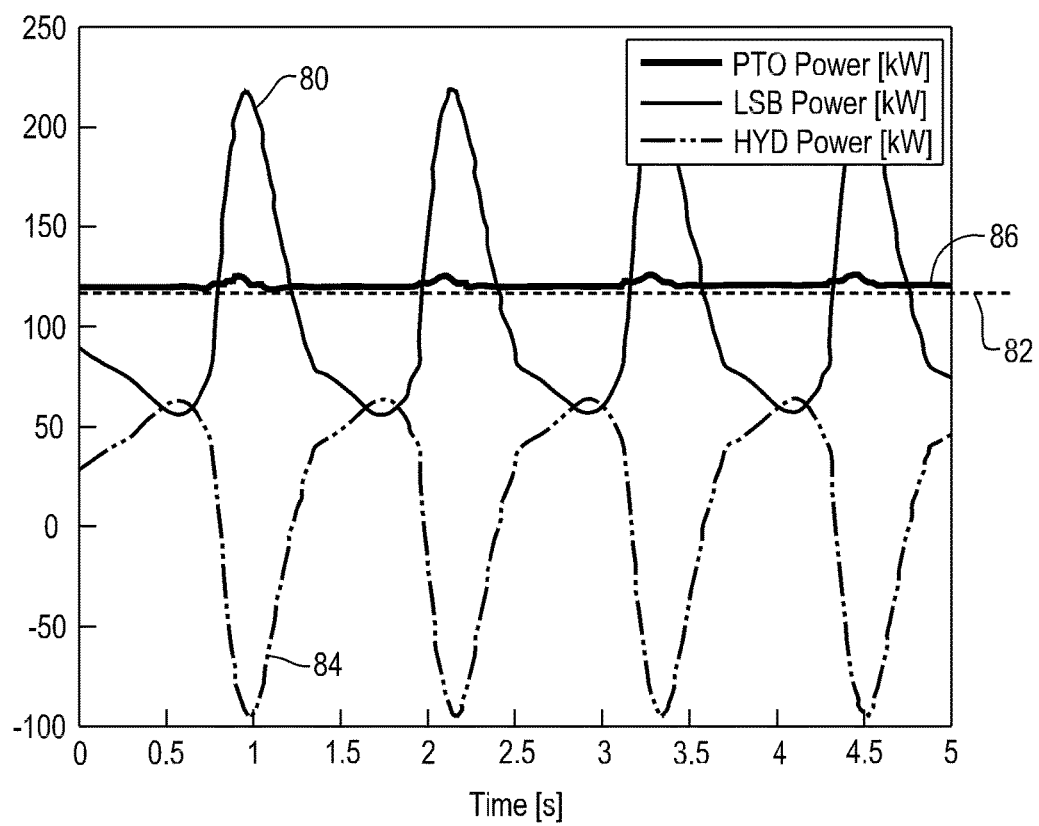
FIG. 5 is a graphical illustration of required power during compression cycles of the baler, hydraulic power input by the APS, and resultant PTO power as a result of the power input by the APS.

Referring now to FIG. 4, there is shown a control schematic of the APS 52 shown in FIGS. 1-3. APS 52 can be thought of as defining a hydraulic flywheel which is based on an over-center variable displacement pump/motor 54, 58 connected between the accumulator 56 and a tank 66. In order to avoid any overpressure, a pressure relief valve 68 is installed between the pump/motor 54, 58 and the accumulator 56. A check valve 70 is also connected to the tank 66 in order to avoid cavitation of the pump/motor 54, 58. A pressure transducer 72 is used to manage the displacement of the pump/motor 54, 58. Basically, during a typical duty cycle, the pump/motor 54, 58 works as a real pump charging the accumulator 56 when the instant power of the baler 10 is lower than the average power (FIG. 5). On the other hand, when the plunger 30 is in a compressing stroke, the pump/motor 54, 58 works as a motor converting hydraulic power into mechanical power that can be provided to the driveline 50. In this way, the typical peak power can be avoided and the PTO power provided from the tractor is always close to the average power. The pump size is a function of the maximum pressure in the accumulator 56 and the operating speed of the pump/motor 54, 58. Because of the additional gearbox 74 coupled with the driveline 50, the pump speed can be increased, e.g., from 1000 RPM (the typical PTO speed during working conditions) up to approximately 2680 RPM. This higher speed allows the use of a smaller pump with a higher hydraulic efficiency and faster response time, in contrast with a larger pump needed when operating at a lower speed condition.

During operation of the baler 10, the plunger 30 reciprocates back and forth during compression cycles within the main bale chamber 26. In the embodiment of the large square baler shown in the graph of FIG. 5, as the plunger 30 reciprocates back and forth (indicated by the top generally sinusoidal curve 80), the power required at the PTO shaft of the large baler can fluctuate between a minimum power requirement up to approximately four times the minimum power requirement (e.g., between approximately 55 and 215 kW). However, the average power indicated by the horizontal dashed line 82 is only about two times the minimum power requirement (e.g., 107 kW). On the other hand, the power provided by the hydraulic pump/motor 54, 58 to the driveline 50 (indicated by the bottom generally sinusoidal curve 84) generally offsets the power fluctuations required at the PTO shaft. Thus, the resultant power required at the PTO shaft is indicated by the generally horizontal line 86 just above the average power line 82.

According to another aspect of the present invention, the electrical processing circuit 62 determines when the PTO has been disengaged, and activates the APS 52 to simultaneously brake the flywheel 44 and store the energy within the power storage device 56 for other purposes. To that end, the electrical processing circuit 62 is coupled with a PTO indicator 90 (FIGS. 3 and 4) providing an output signal indicative of an engagement of the PTO (and thus active mechanical driving of the driveline 50). The electrical processing circuit 62 controls operation of the APS 52, dependent on the output signal from the PTO indicator 90. In one embodiment, the output signal from the PTO indicator 90 represents a disengagement of the PTO, and the electrical processing circuit 62 engages the APS 52 upon receiving the output signal to use energy from the flywheel 44 to store power in the APS 52. At the same time, the APS 52 also functions to brake the flywheel 44 after the PTO is disengaged and the APS 52 is engaged.

The PTO indicator 90 can have different configurations, and can be located onboard the baler 10 and/or the traction unit. For example, it is known that a traction unit in the form of an agricultural tractor can have a manually depressible switch (e.g., knob or lever) that sends a signal to the electronic control unit (ECU) onboard the tractor to disengage the PTO. In one embodiment, the PTO indicator 90 can be this same PTO disengagement switch and the ECU onboard the tractor can provide an output signal (wired or wireless) to the electrical processing circuit 62 associated with the baler 10. The electrical processing circuit 62 then knows that the PTO has been disengaged, and engages the APS 52 to brake the flywheel 44 and store the energy from the flywheel 44 and the power storage device 56 for subsequent use. The manually depressible switch can also be in the form of a virtual switch on a display screen, or other suitable switch which is accessible to the operator of the baler 10.

As another example, the PTO indicator 90 can be in the form of a sensor which senses the rotational speed of the driveline 50 and/or a load (e.g., torque) on the driveline 50. A typical rated operating speed for the driveline of a large square baler is approximately 1000 RPM. If the rotational speed of the driveline 50 falls to a predetermined value, e.g., 850 RPM, then the driveline 50 is slowing down and it can be inferred that the PTO has been disengaged. Alternatively, when the PTO is disengaged, the driveline will freewheel until it comes to a stop and no input torque is applied from the PTO shaft of the tractor. This freewheeling state can be sensed using a load sensor, and an output signal provided to the electrical processing circuit 62 to determine that the PTO has been disengaged. PTO indicator 90 may also be configured in other ways to provide an output signal representing the engagement state of the PTO and/or the driveline 50.

To store a sufficient amount of energy for subsequent uses after the PTO has been disengaged, it may be necessary to provide a larger power storage device 56 and/or multiple power storage devices 56. For example, the power storage device 56 can be configured as one or more hydraulic accumulators, one or more electrical capacitors, one or more electrical batteries and/or one or more additional flywheels.

The energy which is stored within the power storage device(s) 56 can be used for various auxiliary functions onboard the baler 10. For example, such auxiliary functions can include: engaging a bale eject on the baler; raising or lowering a bale discharge chute at the rear of the baler; powering lights onboard the baler; and/or starting rotation of the flywheel upon subsequent start-up of the baler. The stored power can also be used for other auxiliary functions onboard the baler 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural baler, comprising:
 a main bale chamber;
 a plunger reciprocally movable within the main bale chamber during a compression stroke and a return stroke;
 a flywheel associated with the plunger; and
 a driveline associated with the flywheel and couplable with a power take-off of a traction unit;
 an auxiliary power system (APS) coupled with the driveline and configured for receiving power from the driveline and storing the power;
 a power take-off (PTO) indicator providing an output signal indicative of an engagement of the power take-off (PTO); and
 an electrical processing circuit coupled with the auxiliary power system (APS) and the power take-off (PTO) indicator, the electrical processing circuit controlling operation of the auxiliary power system (APS), dependent on the output signal from the power take-off (PTO) indicator.

2. The agricultural baler of claim 1, wherein the output signal from the PTO indicator represents a disengagement of the PTO, and the electrical processing circuit engages the APS upon receiving the output signal to use energy from the flywheel to store power in the APS.

3. The agricultural baler of claim 2, wherein the APS also functions to brake the flywheel after the PTO is disengaged and the APS is engaged.

4. The agricultural baler of claim 2, wherein the APS includes a power storage device, and the electrical processing circuit engages the APS upon receiving the output signal to charge the power storage device.

5. The agricultural baler of claim 4, wherein the APS further includes a hydraulic pump or an electric motor for charging the power storage device.

6. The agricultural baler of claim 4, wherein the power which is stored in the power storage device is operable for auxiliary functions onboard the baler.

7. The agricultural baler of claim 6, wherein the auxiliary functions include at least one of:
 engaging a bale eject on the baler;
 raising or lowering a bale discharge chute at the rear of the baler;
 powering lights onboard the baler; and
 starting rotation of the flywheel upon subsequent start-up of the baler.

8. The agricultural baler of claim 1, wherein the APS is further configured for receiving power from the driveline during the return stroke.

9. The agricultural baler of claim 1, wherein the APS is further configured for transmitting power to the driveline.

10. The agricultural baler of claim 9, wherein the APS is further configured for transmitting power to the driveline during the compression stroke.

11. The agricultural baler of claim 1, wherein the APS includes:
 a power generation device for receiving power from the driveline and generating power;
 a power storage device coupled with and storing power from the power generation device; and
 a power feedback device for transmitting the stored power back to the driveline.

12. A method of operating an agricultural baler, comprising the steps of:
 driving a driveline associated with a flywheel of the baler from a power take-off (PTO) of a traction unit;
 reciprocally moving a plunger within a main bale chamber during a compression stroke and a return stroke;
 receiving power from the driveline using an auxiliary power system (APS) coupled with the driveline;
 storing power in the auxiliary power system (APS);
 providing an output signal from a power take-off (PTO) indicator which is indicative of an engagement of the power take-off (PTO); and
 controlling operation of the auxiliary power system (APS) using an electrical processing circuit which is coupled with the auxiliary power system (APS) and the power take-off (PTO) indicator, dependent on the output signal from the power take-off (PTO) indicator.

13. The method of claim 12, further including the step of braking the flywheel after the PTO is disengaged and the APS is engaged.

14. The method of claim 12, further including the step of using the stored power onboard the baler for auxiliary functions.

* * * * *